(No Model.)

P. LACROIX.
FREIGHT CAR.

No. 268,501. Patented Dec. 5, 1882.

Witnesses:
C. E. Gaylord.
F. B. Townsend.

Inventor:
Pierre Lacroix
By Hill & Drion
His Attorneys

UNITED STATES PATENT OFFICE.

PIERRE LACROIX, OF CHICAGO, ILLINOIS, ASSIGNOR OF ONE-HALF TO DAVID BOURGEOIS, OF SAME PLACE.

FREIGHT-CAR.

SPECIFICATION forming part of Letters Patent No. 268,501, dated December 5, 1882.

Application filed October 6, 1882. (No model.)

*To all whom it may concern:*

Be it known that I, PIERRE LACROIX, of Chicago, in the county of Cook and State of Illinois, have invented a new and useful Improvement in Railway-Cars, of which the following is a description, reference being had to the accompanying drawings, forming a part of this specification, in which—

Figure 1:
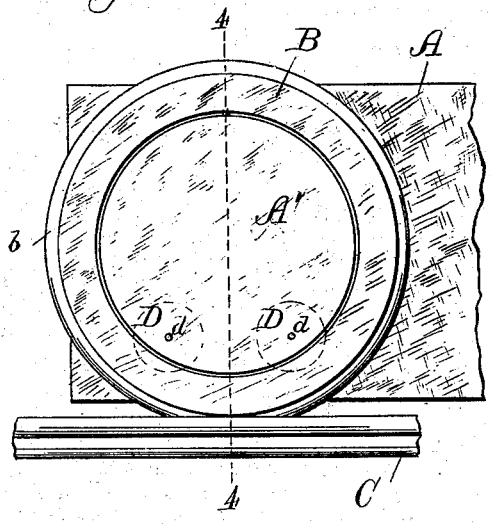
Figure 2:
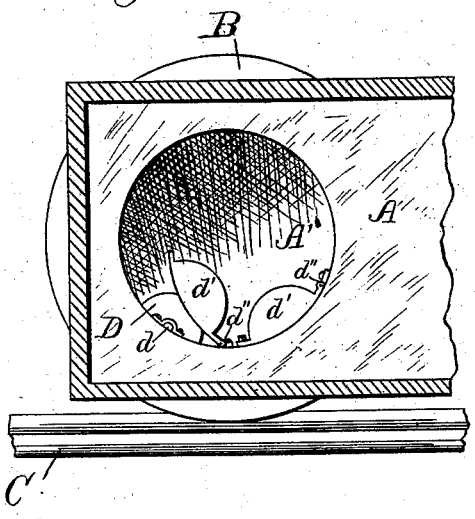
Figure 3:
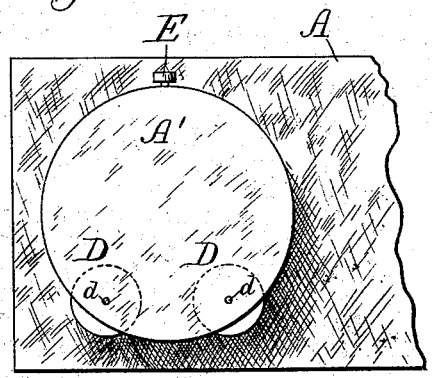
Figure 4:
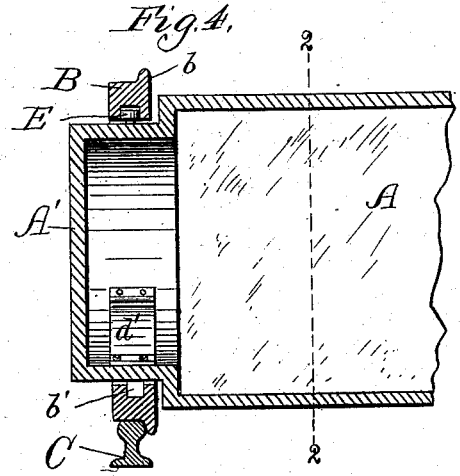

Figure 1 is a side elevation of my improved railway-car with the end cut away. Fig. 2 is a longitudinal vertical section cut through the line 2 2, Fig. 4, and showing a portion of the interior of the car. Fig. 3 is the same as Fig. 1 with the tire removed to show the friction-wheels; and Fig. 4 is a transverse vertical section cut through the line 4 4, Fig. 1, showing the groove upon the inner surface of the tire.

Like letters of reference indicate like parts in the different figures.

The untiring efforts of inventors to produce a railway-car which shall possess the maximum of storage capacity, cheapness, compactness, and strength of construction, combined with durability and lightness of draft, and which may to the utmost extent overcome the great centrifugal force manifested in the turning of curves, are well known. Various devices have been employed to overcome these difficulties, none of which have superseded the faulty and manifestly objectionable car mounted above a high and narrow pair of trucks, and which is so readily overturned.

My invention is intended to obviate the difficulties enumerated above, as well as to do away with the ordinary car trucks and wheels and their attendant expense; and it consists in providing a car the bottom of which shall be substantially as low as the top of the track, thereby bringing the center of gravity to the lowest possible point, and which shall run upon annular wheels or tires revolving around elongated cylindrical projections of the car on its sides and near its ends, respectively, all of which is hereinafter more fully shown, and definitely pointed out in the claims.

In the drawings, A, Fig. 1, represents the frame of the car, including a sufficient portion of one end to show the wheels, the other part, which is similar, being broken away. A portion of the car A', of a cylindrical shape, projects laterally on each side of the car at either end a sufficient distance to permit an annular wheel to be adjusted thereon.

B represents the annular wheel or tire, the inner circumference of which is made somewhat larger than the cylindrical projection A in order to prevent contact therewith. The tire B is provided with a flange, *b*, in the manner in which ordinary car-wheels are constructed, and for a like purpose. Fig. 4 shows the same resting upon the track C, the flange *b* preventing lateral outward movement of the tire B.

Securely fastened within the projection A', at equal distances from the line 4 4, Fig. 2, as well as from the center of said cylinder, are bearings *d d*, which form axes for the friction-wheels D D, which are placed at about midway between the end of the cylindrical projection A' and the side of the main or rectangular portion of the car A. The wheels D D, which are suitably covered by hinged caps *d' d'*, Fig. 2, for the purpose hereinafter mentioned, are so adjusted as to run within a groove, *b'*, Fig. 4, formed in the inner circumference of the tire B, which adjustment, as a whole, should be such as to make the center of the annular wheel B concentric with the cylindrical projection A', in order to prevent frictional contact therewith.

It is obvious that the only movement of the top of the tire B, aside from that in the plane of its revolution, is a lateral movement. To obviate this I place a friction-roller, E, Figs. 3 and 4, upon the top of the cylindrical projection A', the axis of which is secured rigidly to the top of the cylindrical projection A', and is perpendicular to the plane of revolution of the annular wheel B. The friction-roller E is so adjusted as to fit in the slot *b'* and to revolve with the wheel B, according as it is brought in contact with one or the other side of the slot or groove *b'*. One or more like wheels may be placed at the bottom of the cylindrical projection A' and between the wheels D D, to relieve said wheels from undue lateral strain and consequent wear upon their axes. More than one friction-roller may also be placed near the top of the cylindrical projection A', or in any position that may be required to give a smooth and steady movement to the wheel or tire B; but the single wheel E is deemed sufficient for this purpose.

In order to lubricate the wheels D D, tubes may be carried from the outer surface of the projection A' to the axle d d of said wheels. Said letters d d, which I have used to indicate the axis of the wheels D D in Figs. 1 and 3, may also serve to indicate said oil-tubes, as shown in Figs. 1 and 3. Suitable packing-boxes may be employed in connection therewith, as may be deemed necessary.

The space within the cylindrical projections A' is intended to be utilized in common with that in the main portion of the car; and hence, to prevent the grain from being brought in contact with the wheels D D, I provide the covers d' d', which are suitably hinged at d'' d'' and fastened by a pin and staple, or in any manner common for such purposes, thus permitting a ready access to the wheels D D for repairs and like purposes. It is obvious that this arrangement gives a larger storage capacity in the car and tends to bring the greater portion of the weight directly over the wheels, thus obviating the necessity of trussing or bracing the car to the extent often necessary to support its cargo.

The cylindrical projections A' may be extended laterally to any desired length beyond the wheels B, thus increasing the storage capacity and bringing all of said added weight more directly over the wheels; or, should it be desired, the car may be made higher and wider, in which case the annular wheels or tires B may be placed in suitable casings and suitably braced from the inside of the car, which construction I should regard as a practical equivalent of that above described, but which former I prefer.

Suitable openings or doors may be placed in the top or sides of the car, according to the purpose for which the same may be used.

It is obvious that this car is especially adapted for transporting coal, grain, and petroleum. When used for the latter purpose the entire rectangular portion of the car may be constructed of boiler-iron, so as to form a tank for storing and transporting the oil.

Having thus described my invention, what I claim as new, and desire to secure by Letters Patent, is—

1. A railway-car provided with hollow cylindrical projections at or near its ends, extending laterally therefrom, and so mounted upon the inner circumference of annular wheels or tires that the center of gravity of said car may be at the lowest practicable point, substantially as described.

2. A railway-car having hollow cylindrical projections extending laterally therefrom at or near its ends, around which may be adjusted annular wheels or tires revolving upon frictional rollers, substantially as described.

3. A railway-car having hollow cylindrical projections extending laterally therefrom at or near its ends, near the bottom of which are placed two or more friction-rollers having a horizontal axis, and at or near the top of which are placed one or more like rollers having a vertical axis, all so adjusted as to run within a groove upon the inner circumference of an annular wheel or tire, substantially as described.

4. A railway-car having hollow cylindrical projections extending laterally therefrom at or near its ends, near the bottom of which are placed two or more friction-rollers having a horizontal axis, and provided with covers, substantially as and for the purpose set forth.

PIERRE LACROIX.

Witnesses:
D. H. FLETCHER,
D. BOURGEOIS.